(12) United States Patent
MacAskill et al.

(10) Patent No.: US 9,195,843 B2
(45) Date of Patent: Nov. 24, 2015

(54) SYSTEMS AND METHODS FOR PERMISSIONING REMOTE FILE ACCESS VIA PERMISSIONED LINKS

(75) Inventors: Don MacAskill, Los Altos, CA (US); Chris MacAskill, Mountain View, CA (US); Brian Strong, San Jose, CA (US)

(73) Assignee: SMUGMUG, INC., Mountain View, CA (US)

( * ) Notice: Subject to any disclaimer, the term of this patent is extended or adjusted under 35 U.S.C. 154(b) by 1142 days.

(21) Appl. No.: 12/958,178

(22) Filed: Dec. 1, 2010

(65) Prior Publication Data

US 2011/0131633 A1  Jun. 2, 2011

Related U.S. Application Data

(60) Provisional application No. 61/265,724, filed on Dec. 1, 2009.

(51) Int. Cl.
*G06F 21/20* (2006.01)
*G06F 21/62* (2013.01)

(52) U.S. Cl.
CPC .... *G06F 21/6209* (2013.01); *G06F 2221/2119* (2013.01)

(58) Field of Classification Search
CPC ............. G06F 17/30067; G06F 3/067; G06F 17/30227; G06F 21/606; H04L 63/0272; H04L 63/08; H04L 63/10; H04L 63/123; H04L 67/1014
USPC ............. 726/4, 2, 21, 36; 713/150, 163, 181; 380/255, 264, 276
See application file for complete search history.

(56) References Cited

U.S. PATENT DOCUMENTS

| | | | |
|---|---|---|---|
| 6,636,648 B2 * | 10/2003 | Loui et al. | 382/284 |
| 2005/0198031 A1 * | 9/2005 | Pezaris et al. | 707/9 |
| 2005/0246752 A1 * | 11/2005 | Liwerant et al. | 725/109 |
| 2007/0100834 A1 * | 5/2007 | Landry et al. | 707/10 |

* cited by examiner

*Primary Examiner* — Jason K. Gee
*Assistant Examiner* — Sharif E Ullah
(74) *Attorney, Agent, or Firm* — Patterson & Sheridan, LLP

(57) ABSTRACT

Permissioned links for a novel method of credentialing users and assigning permissions to the user using the link to access repositories holding or intended to hold digital files. The permissioned links comprise a unique identifier that can be correlated to a specific repository of digital files and permission set. Users using the permissioned links for access need not enter a login or password. Moreover, permissioned links are portable, allowing multiple users to access the repository of digital files using the same permissioned link.

9 Claims, 21 Drawing Sheets

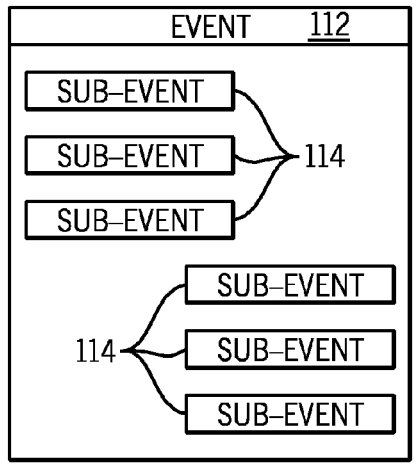
FIG. 2
HTTP://[DOMAIN.SUBDOMAIN]/[OPTIONAL_STRING]/[ENTITY_UNIQUE_IDENTIFIER]/[PERMISSION_STRING]
HTTP://[DOMAIN.SUBDOMAIN]/[PERMISSION_STRING]
HTTP://[DOMAIN.SUBDOMAIN]/[OPTIONAL_STRING]/[PERMISSION_STRING]
HTTP://USER.FSRI.COM/SHARE/10417470_iQnzN#721955398_0U52L
FIG. 3
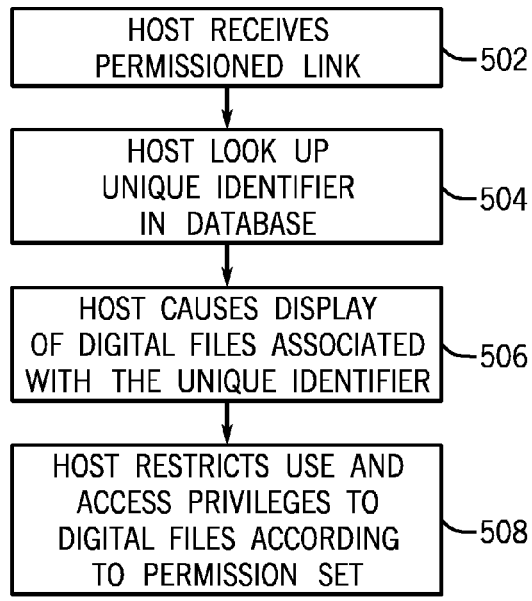
FIG. 4

```
                                 9120
                                     ↘
        ┌──────────────────────────────────────────────────────────┐
        │     MY HOMEPAGE |LOGOUT|HELP|ADMIN|✱|SEARCH    |🔍|↵     │
        ├──────────────────────────────────────────────────────────┤
        │ SALLY SMITH (FFFABULOUS) > CONTROL PANEL > MANAGE EVENTS  9126─┐
        │                                                                │
        │ NEW EVENT   (HELP)                      9127─┐◁CANCEL SAVE    │
        │  ▽ EVENT INFORMATION                                           │
        │    ┌────────────────────────────────────────────────┐          │
        │    │           NAME: FREDERIQUE'S WEDDING   ─9121A  │          │
        │    │      EVENT URL: FREDERIQUE'S-WEDDING   ─9121B  │          │
        │    │           DATE: 07 /16 /2011    🗓     ─9121C  │          │
        │ 9121│    DESCRIPTION: [              ]       ─9121D  │          │
        │    │       LOCATION: CANNES, FRANCE          ─9121E  │          │
        │    └────────────────────────────────────────────────┘          │
        │  ▽ EVENT SETTINGS                                              │
        │    ┌────────────────────────────────────────────────┐          │
        │    │      SLIDESHOW: ON OFF (SETTING) ─9122A        │          │
        │    │ GUEST REGISTRATION: REQUIRED SUGGESTED OPTIONAL OFF ─9122B│
        │    │        PRIVACY: PUBLIC UNLISTED ─9122C         │          │
        │    │        ☑ FEATURED ON HOMEPAGE                  │          │
        │ 9122│        ☑ PASSWORD PROTECT THIS EVENT           │          │
        │    │       PASSWORD: FFFABULOUS       ─9122D        │          │
        │    │ CUSTOMER PASSWORD HINT: MORE FABULOUS THAN FABULOUS │     │
        │    │        ☑ PASSWORDED GALLERY ACCESS             │          │
        │    └────────────────────────────────────────────────┘          │
        │  ▽ GALLERIES                              9123A─┐+ADD          │
        │  ┌──────────────────────────────────────────────┐              │
        │ 9123│       NO GALLERIES HAVE BEEN ADDED           │              │
        │  └──────────────────────────────────────────────┘              │
        │  ▽ PARTICIPANTS AND REGISTERED GUESTS    9124A─┐+ADD           │
        │  ┌──────────────────────────────────────────────┐              │
        │ 9124│      NO PARTICIPANTS HAVE BEEN ADDED         │              │
        │  └──────────────────────────────────────────────┘              │
        │  OTHER GUESTS                                                  │
        │  ┌──────────────────────────────────────────────────────┐      │
        │  │ GUEST EVENT LINK: LINK WILL APPEAR AFTER YOU SAVE 9125│     │
        │  └──────────────────────────────────────────────────────┘      │
        │                                     9127─┐◁CANCEL SAVE         │
        └──────────────────────────────────────────────────────────┘
                                                              9126

| SLIDESHOW SETTINGS | |
|---|---|
| SOURCE: | GALLERY |
| HEIGHT: | 600 px |
| CLICK TO IMAGE: | ○ YES  ● NO |
| CAPTIONS: | ● YES  ○ NO |
| SHOW THUMBNAILS: | ● YES  ○ NO |
| AUTO START: | ● YES  ○ NO |
| SPEED: | MEDIUM |
| SHOW SPEED: | ○ YES  ● NO |
| PAGE STYLE: | ● BLACK  ○ WHITE |
| SHOW BUTTONS: | ● YES  ○ NO |
| RANDOM START: | ○ YES  ● NO |
| RANDOMIZE: | ○ YES  ● NO |
| SPLASH URL: | |
| SPLASH DELAY: | 500 MILLISECONDS |
| CROSS FADE SPEED: | 350 MILLISECONDS |
| PREVIEW | CANCEL  OK |

```
                                                                    ┌─ 9120
                    MY HOMEPAGE|LOGOUT|HELP|ADMIN|*|SEARCH      |Q|⌄
 SALLY SMITH (FFFABULOUS)> CONTROL PANEL > MANAGE EVENTS

NEW EVENT    (HELP)                                   ◁CANCEL  SAVE
 ┌──────────────────────────────────────────────────────────────────┐
 │ ▽ EVENT INFORMATION                                              │
 │   ┌────────────────────────────────────────────────────┐         │
 │   │          NAME: │FREDERIQUE'S WEDDING        │      │         │
 │   │     EVENT URL: │FREDERIQUE'S-WEDDING        │      │         │
 │   │          DATE: │07/16/2011              │🗓     │     9121   │
 │   │   DESCRIPTION: │                            │      │         │
 │   │      LOCATION: │CANNES, FRANCE              │      │         │
 │   └────────────────────────────────────────────────────┘         │
 │ ▽ EVENT SETTINGS                                                 │
 │   ┌────────────────────────────────────────────────────┐         │
 │   │     SLIDESHOW: [ON][OFF] (SETTING)                 │         │
 │   │ GUEST REGISTRATION: [REQUIRED][SUGGESTED][OPTIONAL][OFF]     │
 │   │       PRIVACY: [PUBLIC][UNLISTED]                  │         │
 │   │               ☑ FEATURED ON HOMEPAGE               │         │
 │   │               ☑ PASSWORD PROTECT THIS EVENT        │   9122  │
 │   │      PASSWORD: │FFFABULOUS                  │      │         │
 │   │ CUSTOMER PASSWORD HINT: │MORE FABULOUS THAN FABULOUS│        │
 │   │               ☑ PASSWORDED GALLERY ACCESS          │         │
 │   └────────────────────────────────────────────────────┘         │
 │ ▽ GALLERIES                                              +ADD    │
 │   ┌────────────────────────────────────────────────────┐         │
 │   │  ⊗      ⊗                                          │         │
 │   │ ┌──┐500 ┌──┐   ┌──┐500                             │  9123   │
 │   │ │▢▯│  ↘ │≡ │ ↙ │▨ │                                │         │
 │   │ └──┘    └──┘   └──┘                                │         │
 │   │ BLABLABLA STATS  FF                                │         │
 │   │ UNSAVED   UNSAVED UNSAVED                          │         │
 │   │                               ☐ ARRANGE MODE       │         │
 │   └────────────────────────────────────────────────────┘         │
 │ ▽ PARTICIPANTS AND REGISTERED GUESTS                     +ADD    │
 │   ┌────────────────────────────────────────────────────┐         │
 │   │         NO PARTICIPANTS HAVE BEEN ADDED            │  9124   │
 │   └────────────────────────────────────────────────────┘         │
 │ OTHER GUESTS                                                     │
 │ GUEST EVENT LINK: LINK WILL APPEAR AFTER YOU SAVE         9125   │
 │                                                                  │
 │                                              ◁CANCEL   SAVE      │
 └──────────────────────────────────────────────────────────────────┘
```

92240

PARTICIPANT

NAME:
EMAIL(S):

SEPARATE MULTIPLE EMAILS WITH A COMMA

NOTES:

CANCEL  OK

MY HOMEPAGE | LOGOUT | HELP | ADMIN | ✱ SEARCH 🔍

SALLY SMITH (FFFABULOUS) > CONTROL PANEL > MANAGE EVENTS

NEW EVENT (HELP)   ◁ CANCEL  SAVE

▽ EVENT INFORMATION

- NAME: FREDERIQUE'S WEDDING
- EVENT URL: FREDERIQUE'S-WEDDING
- DATE: 07/16/2011
- DESCRIPTION:
- LOCATION: CANNES, FRANCE

▽ EVENT SETTINGS

- SLIDESHOW: [ON] [OFF] (SETTING)
- GUEST REGISTRATION: [REQUIRED] [SUGGESTED] [OPTIONAL] [OFF]
- PRIVACY: [PUBLIC] [UNLISTED]
- ☑ FEATURED ON HOMEPAGE
- ☑ PASSWORD PROTECT THIS EVENT
- PASSWORD: FFFABULOUS
- CUSTOMER PASSWORD HINT: MORE FABULOUS THAN FABULOUS
- ☑ PASSWORDED GALLERY ACCESS

▽ GALLERIES   [+ADD]

- BLABLABLA UNSAVED
- STATS UNSAVED
- FF UNSAVED

☐ ARRANGE MODE

▽ PARTICIPANTS AND REGISTERED GUESTS   [+ADD]

| NAME | EVENT PAGE | FAVORITES | SHARE | |
|---|---|---|---|---|
| 👤 CHRIS AND TONI | AVAILABLE AFTER SAVING | AVAILABLE AFTER SAVING | AVAILABLE AFTER SAVING | UNSAVED ⊗ |
| 👤 ANDY  9124 | AVAILABLE AFTER SAVING | AVAILABLE AFTER SAVING | AVAILABLE AFTER SAVING | UNSAVED ⊗ |

OTHER GUESTS

GUEST EVENT LINK: LINK WILL APPEAR AFTER YOU SAVE   9126

9127 — ◁ CANCEL  SAVE

FIG. 15

```
                                                              ┌─ 9120
  ┌─────────────────────────────────────────────────────────────┐
  │       MY HOMEPAGE│LOGOUT│HELP│ADMIN│✱│SEARCH    │🔍│       │
  ├─────────────────────────────────────────────────────────────┤
  │ SALLY SMITH (FFFABULOUS) > CONTROL PANEL > MANAGE EVENTS    │
  │                                                             │
  │ FREDERIQUE'S WEDDING (HELP)              ◁CANCEL │ SAVE     │
```

▽ EVENT INFORMATION

| | |
|---:|:---|
| NAME: | FREDERIQUE'S WEDDING |
| EVENT URL: | FREDERIQUE'S-WEDDING |
| DATE: | 07 / 16 / 2011 |
| DESCRIPTION: | |
| LOCATION: | CANNES, FRANCE |

▽ EVENT SETTINGS

| | |
|---:|:---|
| SLIDESHOW: | ON │ OFF (SETTING) |
| GUEST REGISTRATION: | REQUIRED │ SUGGESTED │ OPTIONAL │ OFF |
| PRIVACY: | PUBLIC │ UNLISTED |
| | ☑ FEATURED ON HOMEPAGE |
| | ☑ PASSWORD PROTECT THIS EVENT |
| PASSWORD: | FFFABULOUS |
| CUSTOMER PASSWORD HINT: | MORE FABULOUS THAN FABULOUS |
| | ☑ PASSWORDED GALLERY ACCESS |

▽ GALLERIES                                                +ADD

BLABLABLA    STATS    FF

☐ ARRANGE MODE

▽ PARTICIPANTS AND REGISTERED GUESTS                       +ADD

| NAME | EVENT PAGE | FAVORITES | SHARE | |
|---|---|---|---|---|
| 👤 CHRIS AND TONI | VIEW PERSONAL PAGE | VIEW FAVORITES (0) | ✉ | ⊗ |
| 👤 ANDY | VIEW PERSONAL PAGE | VIEW FAVORITES (0) | ✉ | 9124 ⊗ |
| OTHER GUESTS | 9124A | 9124B | 9124C | 9125 |

GUEST EVENT LINK: HTTP://FABULOUS.JOHN-2.YOURSITE.NET/EVENT/FREDERIQUES-WEDDING 9126

9127 — ◁CANCEL │ SAVE

91240

```
┌─────────────────────────────────────────────────────────┐
│                         EMAIL                           │
├──────────┬──────────────────────────────────────────────┤
│     TO:  │ CHRIS@YOURSITE.COM, TONI@YOURSITE.COM        │
│ SUBJECT: │ FOR YOU: (EVENT.NAME) BY (EVENT.PRO.NAME)    │
│ MESSAGE: │ DEAR (EVENT.PARTICIPANT.NAME)                │
│          │                                              │
│          │ I'VE CREATED A SPECIAL EVENT PAGE JUST       │
│          │ FOR YOU. DROP IN TO BROWSE GALLERIES         │
│          │ FROM (EVENT.NAME), TAG YOUR FAVORITES,       │
│          │ SHARE WITH FRIENDS, AND EVEN BUY             │
│          │                                              │
│  ☑ SEND A SECOND EMAIL FOR THEM TO SHARE THIS EVENT WITH FRIENDS. │
│ SUBJECT: │ SHARE WITH FRIENDS: (EVENT.NAME) BY (EVENT.PRO.NAME) │
│ MESSAGE: │ HI (EVENT.PARTICIPANT.NAME)                  │
│          │                                              │
│          │ I THOUGHT YOU MIGHT WANT TO TELL             │
│          │ YOUR FRIENDS ABOUT THIS EVENT, TOO. IF SO    │
│          │ JUST COPY AND SEND THEM THIS LINK:           │
├──────────┴──────────────────────────────────────────────┤
│ EMAIL                                                   │
│ MACROS:  (EVENT.NAME), (EVENT.PARTICIPANT.NAME), (EVENT.PARTICIPANT.URL), │
│          (EVENT.GUEST.URL), (EVENT.PRO.NAME)            │
│                                                         │
│ [SAVE AS TEMPLATE]                    [SEND ME A TEST]  │
│ [PREVIEW]                             [CANCEL] [OK]     │
└─────────────────────────────────────────────────────────┘
```

```
                          HOME|LOGIN|HELP|SEARCH        |Q|≠
THIS EVENT REQUIRES A PASSWORD TO CONTINUE

PASSWORD: [                              ]
              HINT "MORE FABULOUS THAN FABULOUS"
         ☐ DON'T SAVE THIS PASSWORD ON THIS COMPUTER
                        [SUBMIT]
```

FIG. 19

EVENT REGISTRATION — 9200

TO BROWSE THIS EVENT, PLEASE ENTER YOUR NAME AND EMAIL ADDRESS

YOUR NAME: [       ]
YOUR EMAIL: [       ]
ENTER THE CODE: [       ]

L F V M   CODE UNREADABLE?

NOT YOUR FIRST TIME? IF YOU'VE REGISTERED BEFORE, CHECK YOUR EMAIL FOR THE LINK WE SENT YOU  [REGISTER] — 9202

EVENT REGISTRATION — 9204

THANKS! WE SENT YOU AN EMAIL WITH A NEW EVENT LINK. JUST CLICK IT TO BEGIN BROWSING THE EVENT

| EVENT REGISTRATION CONFIRMATION |
| SALLY SMITH TO ME |

DEAR JOHN,

I'VE CREATED A SPECIAL EVENT PAGE JUST FOR YOU. DROP IN TO BROWSE GALLERIES FROM FREDRIQUE'S WEDDING, TAG YOUR FAVORITES, AND EVEN BUY PRINTS AND GIFTS.

EXCITED YET? CLICK HERE  9212
HTTP://FFFABULOUS.JOHN-2.YOURSITE.NET/EVENT/CONFIRM/G?3G+G=522&QUE+0469FD822A188058EE906E6428208247

DON'T LOSE THIS INFO BECAUSE YOU CAN ONLY ACCESS YOUR FAVORITES FROM THAT LINK

[REPLY] [FORWARD]

EVENT REGISTRATION

TO CHOOSE FAVORITES FROM THIS EVENT, PLEASE ENTER YOUR NAME AND EMAIL ADDRESS

YOUR NAME: [          ]
YOUR EMAIL: [          ]
ENTER THE CODE: [          ]

[Z L 6 U]  CODE UNREADABLE?

9208
☐ DO NOT SHOW THIS AGAIN  [NO THANKS] [REGISTER]

FIG. 25     9206

SYSTEMS AND METHODS FOR PERMISSIONING REMOTE FILE ACCESS VIA PERMISSIONED LINKS

RELATED APPLICATIONS

This application claims the priority of and incorporates by reference U.S. Provisional Patent Application No. 61/265,724, filed Dec. 1, 2009.

BACKGROUND

This disclosure is related to remote file access systems. According to this disclosure, traditional access and permissioning methods are replaced with a novel system of using specifically permissioned links to dispense with the need for users of host to enter a username and password to access the systems contemplated herein.

SUMMARY

Permissioned links for a novel method of credentialing users and assigning permissions to the user using the link to access repositories holding or intended to hold digital files. The permissioned links comprise a unique identifier that can be correlated to a specific repository of digital files and permission set. Users using the permissioned links for access need not enter a login or password. Moreover, permissioned links are portable, allowing multiple users to access the repository of digital files using the same permissioned link.

DRAWINGS

The above-mentioned features and objects of the present disclosure will become more apparent with reference to the following description taken in conjunction with the accompanying drawings wherein like reference numerals denote like elements and in which:

FIG. 2 is a relational diagram of an embodiment of an event;

FIG. 3 illustrates embodiments of permissioned links to permit unknown users access to repositories belonging to an event;

FIG. 4 is a flow diagram of an embodiment of the resolution of a permissioned link;

FIG. 9 is an exemplary embodiment of a webpage that provides an interface for an owner of an event to specify options for the event;

FIG. 10 is an exemplary embodiment of a webpage the provides a window allowing the owner of an event to specify options for a slideshow to be displayed on the event webpage;

FIG. 12 is an exemplary embodiment of a webpage showing selection of unsaved galleries and other fields being filled out by an event owner in the specification of event options;

FIG. 13 is an exemplary embodiment of a window allowing an event owner to add a participant to an event;

FIG. 14 is an exemplary embodiment of a webpage showing selection of unsaved galleries, participants, and other fields being filled out by an event owner in the specification of event options;

FIG. 15 is an exemplary embodiment of a webpage showing a saved event options webpage;

FIG. 16 is an exemplary embodiment of a window for sending event notifications to participants;

FIG. 17 is an exemplary embodiment of a webpage showing a saved event options webpage where, in additional to participants, guests have joined the event as registered guests;

FIG. 19 is an exemplary embodiment of a window prompting a visitor for a password prior to viewing content in an event webpage;

FIG. 22 is an exemplary embodiment of an event registration window;

FIG. 23 is an exemplary embodiment of an event registration confirmation page;

FIG. 24 is an exemplary embodiment of an event registration confirmation email; and FIG. 25 is an exemplary embodiment of an event registration window shown to unregistered guests where registration is suggested to the unregistered guest.

DETAILED DESCRIPTION

Figure 1:
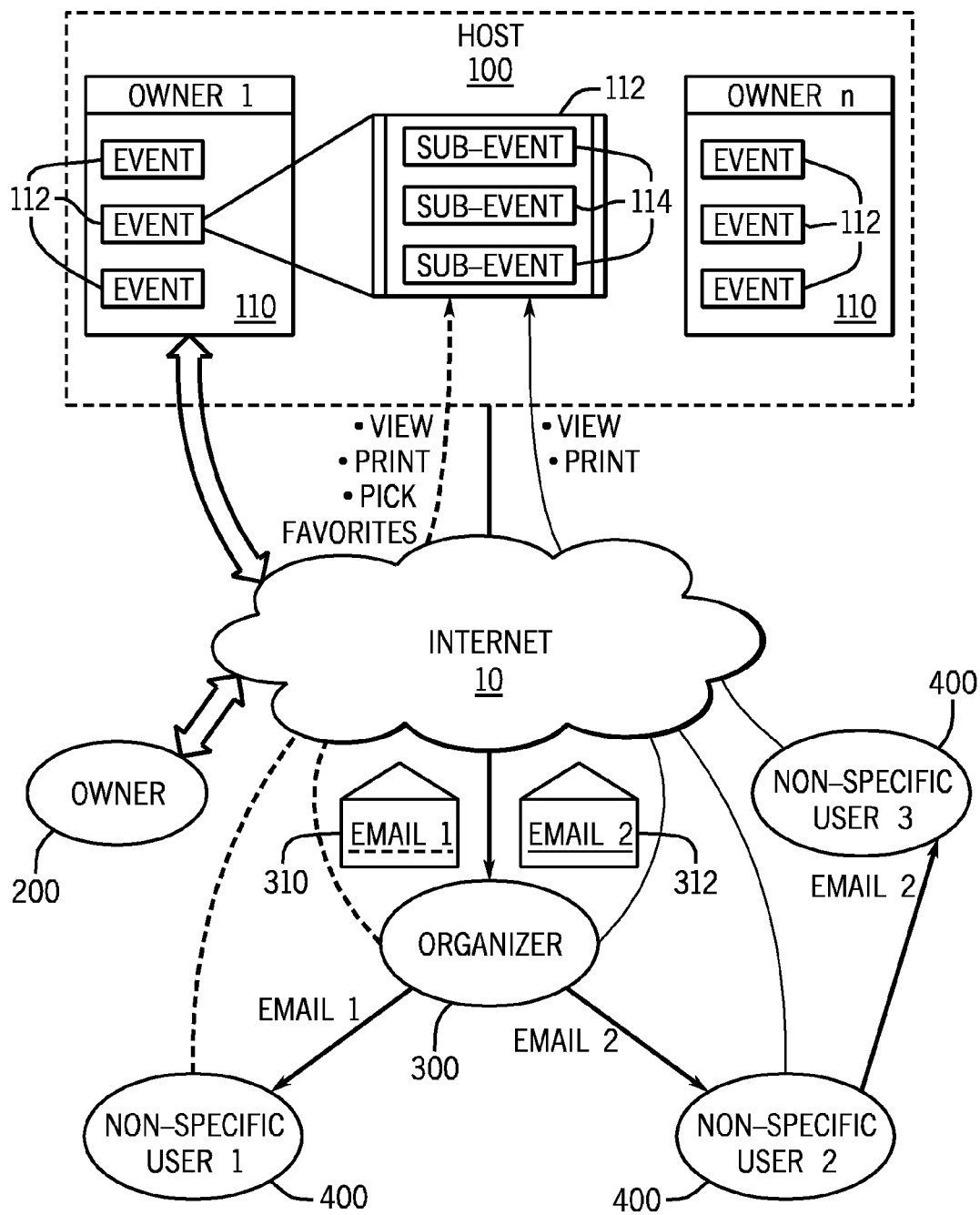
FIG. 1 is a block diagram of an embodiment of a remote file access system utilizing permissioned links for user access and control illustrating the relationship of the users to the host and the various access points.

In the following detailed description of embodiments of the present disclosure, reference is made to the accompanying drawings in which like references indicate similar elements, and in which is shown by way of illustration specific embodiments in which the present disclosure may be practiced. These embodiments are described in sufficient detail to enable those skilled in the art to practice the present disclosure, and it is to be understood that other embodiments may be utilized and that logical, mechanical, biological, electrical, functional, and other changes may be made without departing from the scope of the present disclosure. The following detailed description is, therefore, not to be taken in a limiting sense, and the scope of the present disclosure is defined only by the appended claims. As used in the present disclosure, the term "or" shall be understood to be defined as a logical disjunction and shall not indicate an exclusive disjunction unless expressly indicated as such or notated as "xor."

As used herein, the term "repository" shall be understood to mean a data structure the stores the location (e.g., a link to) at least one digital file or other repository.

As used herein, the term "server" or "servers" shall be understood to mean one or more computers in a network that is used to provide services to other computers in the network, including remote computers.

As used herein, the term "store," "storage," and derivates thereof shall be defined based on context: in the context of storage of digital files, the term store shall be understood to mean storage of the digital file on a storage media (e.g., a machine readable or computer readable media) and expressly encompasses storage by a third party storage provider; in the context of storage of files in a repository, the term shall be understood to mean storage of an address, link, pointer, or the like of the file on a storage media. Thus, repositories do not directly store digital files, according to embodiments, but store information related to where the digital file is physically located on storage media, as well as other information related to each digital file. Storage in the context of a repository will often be accomplished by storing the above mentioned data in a database.

As used herein, the term "file" or "files" shall be understood to mean files stored on a storage media, for example: standard and non-standard format image files, audio files, video files, word processing files, and all other files that are commonly stored under common and non-common operating systems such as WINDOWS, MACINTOSH, LINUX, UNIX, and others. The term "file" or "files" shall also be understood to mean organizational units that embody a functionality (which may be embodied by one or more files stored on a digital storage and used in conjunction with each other to provide the functionality), such as an event or calendar item; a gallery of images, word processing documents, video files, music files; a list, such as a playlist or wishlist; a database; a game; a forum; a weblog; a file sharing service; or a remote machine access.

This disclosure presents a new way to access and permission access private remote files. Today, internet users store large amounts of information, generally in the form of digital files, remotely over the internet. Backup services, remote disk drives, photo sharing, and other similar websites provide platforms in which digital files are remotely accessible. Often, the locations where the files reside are completely unknown to the user owning the files but for a web uniform resource indicator (URI). Often, the users who cause storage of these digital files remotely desire to maintain privacy for their digital files, making the files availably only to intended users.

To address privacy concerns, many websites that facilitate storage of digital files require user accounts to control access to the files. User accounts traditionally require at least a username (or other account identifier) and a password. Where a user having an account wishes to share digital files with other users, he must either share his login credentials with the other user, or link his account with a user account for the other user, in which the other user will have their own username and password. Typically, permissions, which are rules defining permissible access and use of the digital files are associated with each account.

In many instances, forcing users to log into a remote file access system is cumbersome for casual users. For example, for photo sharing services, many users desire the right to browse private galleries without having to register a username and password and login. These casual users want a hassle-free system to access the digital files, without the inconvenience of account-type access. Nevertheless, the owners of the digital files, for example professional photographers or musicians, depend on a modicum of privacy and access control to avoid misappropriation of their digital files. These users require some level of access control and privacy to ensure only intended users can access the digital files, and also require the ability to permission access.

For example, in the case of photo sharing services, a user may commission a professional photographer to capture an event, for example, and may wish to have a large plurality of individuals access the photos for the right to view, or view and print, or view, organize, and print making the process of credentialing each user cumbersome. Additionally, many casual users with no intention of using the system aside from viewing the photos may prefer to remain anonymous from the remote file access system, or these users fear email spamming, cyber stalking, or leaking of personal details if personal information is provided to the service. Other users are simply bothered by the hassle of logging in. Still other infrequent users of the service cannot remember user names and passwords, and must endure further hassle by reregistering or looking up and resetting passwords. Forcing these users to register traditional login credentials is a deterrent to customers considering using the service or for print sales that might otherwise be realized if the user isn't required to register or log into the service.

Although the above example user photo sharing sites as an example, the principles are extendable to music sharing sites, calendaring sites such as GOOGLE CALENDAR or AIRSET, document and collaboration sites such as GOOGLE DOCS or MICROSOFT OFFICE LIVE, social networking sites such as FACEBOOK and MYSPACE, and so forth. Generally, the principles, methods, and devices disclosed herein are readily adaptable without undue experimentation to any platform for storing or causing the storage of digital files (e.g., to a third party storage service) for any purpose, especially those in which multiple users wish to access the private, digital files of another.

According to this disclosure, rather than depending on traditional login credentials to provide access to a repository holding digital files, the owner of the files causes the system to generate permissioned links, which can be communicated to one or more users, for example by attaching the permissioned link to an email or posted in a secure location online. A permissioned link directs other users to a repository holding or intended to hold digital files and informs the host system of the permissions for the user entering the repository via the permissioned link.

Generally, the host will not have information regarding the identity of the user of the repository of digital files who accessed the repository via the permissioned link, even those users broadly permissioned to manipulate, organize, or use the files. Thus, for the user the experience is completely anonymous, and users will not have the hassles associated with other credentialing systems, for example user name and passwords.

Where the owner requires privacy for the repositories of information, the URI for the repository may be randomized to prevent undesired users from "accidentally" stumbling upon a URI linking private digital files.

Remote file access system is also referred to herein as host 100. According to embodiments, and as illustrated in FIG. 1, an exemplary remote file access system is shown, illustrating the relationship between host 100 and users 200, 300, 400. Of particular note, it will be readily observed that the only user that is required to input a username and password is owner 200. Organizer 300 and each of non-specific users 400 do not require a username or password to access the content accessible via host 100, but rather access the content using only permissioned links that are originally provided by owner 200.

According to the embodiment illustrated in FIG. 1, remote file access system or host 100 is shown being accessible to various users 200, 300, 400 via internet 10. Host comprises, for example, one or more computers (e.g., one or more servers) with software disposed thereon that permits owners 200 to upload files, have those files stored with host 100 or with a third party vendor used for mass storage of files, and allow the files to be accessed and used according to permissions granted to various users 200, 300, 400. For example, if host 100 is a photograph sharing website, host 100 will run software capable of receiving files, causing the files to be stored, and displaying the files. Host 100 may run software or be configured to perform many other tasks, including printing photos, editing photos, downloading photos, or using the photos as part of other derivative works. According to another example, host 100 may be a music sharing site that would allow for the upload, listing of music tracks, download of music tracks, and playing of the music tracks, displaying of album artwork and track lyrics, etc. Artisans will appreciate the various desirable features that may be available to users 200, 300, 400 of host according to the type of files and the intended functionality of remote file access system 100.

According to embodiments, host 100 provides each owner 200 with an owner account 110. Owner accounts 110 may be implemented in any way that at least gives owner 200 an option to privately and securely upload digital files to host 100.

According to embodiments of an organizational principle, within an owner account 110, owner 200 creates events 112. Event 112 is an organizational principle for the files accessed with host 100. According to embodiments, FIG. 2 illustrates how an event may be organized. Each event 112 is divided into sub-events 114, which are a more granular level of organization within each event 112. According to embodiments, each sub-event 114 may be further divided into sub-sub-events, and so forth as desirable by the particular implementation of host 100.

For example, in the context of digital photograph sharing, event 112 may be a wedding or a golf tournament, each of which comprises a repository of digital files of the particular event or of sub-events. In a photo sharing context, for example, each repository is a gallery of digital images. In the context of a wedding, the sub-events 114 each sub-event comprising a repository of digital images, for example of the wedding ceremony, the reception, the rehearsal dinner, or a private sitting of the bride in her wedding dress. If the event is a golf tournament, each sub-event 114 comprise a repository of files. For example, the sub-events may be defined as each golf round and a repository of files for a gala event held at the end of the tournament; alternately each player may have a dedicated sub-event 114 comprising a repository of files of that particular player. According to embodiments, all files contained in a sub-event repository will be available for viewing in a main event webpage; likewise, all files contained in sub-sub-events are visible when the sub-event is accessed. According to other embodiments, digital files are contained only in a single repository. I.e., each sub-event repository will contain the digital files, but the event repository will only contain a link to the sub-event.

According to embodiments, each event, sub-event, sub-sub-event, etc. comprises a repository for storing digital files or links to event children (sub-events for an event, sub-sub-events for sub-events, etc.). In these embodiments, each event, sub-event, sub-sub-event, etc. may comprise other data or data structures associated with it. For example, an event may have a repository, a list of users and registered guests, and a slideshow. According to other embodiments, each event, sub-event, etc. is its own repository designed only to contain digital files and a set of data defining the repository (e.g., title, date, repository metadata, repository permissions, etc.). According to this second set of embodiments, the event, sub-event, etc. is a container for holding digital files or links to children containers. According to embodiments, combinations of these embodiments are also contemplated. For example, the event contains a repository and other related data/data structures such as slideshows, event data, user and guest lists, etc., while each sub-event is a simple repository. Artisans will note that the repositories defined herein are data structures defined, for example, in a database table. As such, the repositories do not actually store the digital files, but store links where the digital files are stored. As such, remote file access system need not store the digital files—storage can be done by a third party and remote file access system stores a link defining where the digital file can be accessed from.

For example, in a website designed to provide access and playback of music, each event 112 comprises a genre. Each sub-event 114 may comprise an artist repository that organizes files for that particular artist, and sub-sub-events comprise albums, each album comprising a repository of files belonging to the album and artist.

Turning again to embodiments illustrated by FIG. 1, first owner 200 connects to host via internet 10. Similarly, other owners (e.g., second owner, third owner, . . . , $n^{th}$ owner) 200 also connect to host 100 via internet 10. According to embodiments, each owner 200 is prompted to input a username and a password that allows host 100 to distinguish between the various owners 200. According to other embodiments, a given owner may be identified by IP address other differentiating criteria. Any method of distinguishing among owners 200 is contemplated, provided each owner 200 can be uniquely identified by host 100. According to still other embodiments, host 200 may be dedicated to a single owner 100, in which no differentiating criteria or login procedure would be needed.

Each owner 200 is granted a set of owner's permissions. Owner's permissions set the metes and bounds of the owner's 200 abilities with respect to host 100. File or software permissioning is well known and understood by artisans. For example, in the context of access of digital photographs, owner's permissions allow owner 200 to create events 112 and sub-events 114; upload photographs; edit photographs; download photographs; edit photograph metadata; watermark photographs; print photographs; create derivate works from the photographs; and delete photographs, events, and sub-events, etc. According to embodiments, owner 200 is permitted to determine the permissions of, on a case-by-case basis, organizer 300 and non-specific user 400 permission sets by creating permissioned links. Owner 200 is only able to create a permissioned link that permissions organizer 300 and non-specific user 400 if owner 200 is also granted those permissions. According to embodiments, permissions for organizer 300 and non-specific users 400 are set to a system default from which owner selects a default permission set for each permissioned link. Thus, owner 200 need not specifically set all of the permissions in a given permission set associated with a permissioned link.

Organizer 300 is, according to embodiments, a person who directly receives communications containing permissioned links from owner 200. Owner 200 causes host 100 to generate emails with permissioned links that are communicated to organizer 300 so that organizer 300 can access digital files associated with event 112. When organizer 300 or non-specific user 400 clicks on a permissioned link, they are linked to a location, for example a webpage for an event or sub-event or a remote folder (i.e., repository), containing or intended to contain digital files. Users using the permissioned links need not register for an account nor input login credential information to access the files linked by the permissioned link. Rather, the link itself contains the "key" necessary to access the permissioned webpage. According to embodiments, owner 200 designates organizers 300, who then receive the communications having the permissioned links, according to embodiments.

For example, a photographer (owner 200) designates bride (organizer 300) to be able to view wedding photographs, select favorites among the wedding photographs (which then populate a favorites gallery or sub-event), and print the photos. Thus, the photographer causes email 310 to be sent to the bride with a permissioned link granting the bride the above described permissions. If the bride, who may be on her honeymoon, would prefer that her mother select favorites that are intended to make up a wedding album, she forwards email 310 with the permissioned link to her mother (non-specific user 400), who then is able to access the photographs with the bride's permissions via the permissioned link. Like the bride, the mother need not register with host 100 or provide any other login credentials to access the photographs.

The photographer also causes email 312 with a different permissioned link to be sent to bride, which the photographer intends for the bride to forward to family and friends. Using this permissioned link, non-specific users 400 are able to view and print the photos. When the bride receives email 312, she then forwards it to her bridesmaids and friends (non-specific users 400) so they are able to look at and print the wedding photos. Because this permissioned link is associated with a permission set that doesn't allow for selection of favorites, the family and friends will not be able to select photos that will go into the favorites folder. Moreover, the bridesmaid and friends need not register with host 100 or login with any sort of credentials. Rather, their access and privilege level is determined based on their permissioned link.

As illustrated in the exemplary embodiment shown in FIG. 1, the bride is organizer 300. She receives two emails (email 1 and email 2) from host 100 having permissioned links in them. For each email, she may use the permissioned link to gain access to event 112 and its sub-events 114, depending on the permissions granted. For example, email 1 permits the user using the link to view photos, print photos, and designate favorites; email 2 permits the user using the link to view and print photos only. The bride (organizer 300) may forward email 1 to her mother, a non-specific user 400 (non-specific user 1). Using the link in the email, her mother may then view and print photos, as well as designate favorites. The bride may also forward email 2 to her maid-of-honor, a different non-specific user 400 (non-specific user 2). Using the link, the maid-of-honor can view the photos and print the photos, but is not able to designate favorites. The maid-of-honor may also forward email a2 to another bridesmaid (non-specific user 3), who would likewise be able to use the permissioned link in email 2 to view and print photos from the wedding (event 112 and the sub-events 114). None of organizer 300, non-specific user 1, non-specific user 2, or non-specific user 3 needs to input a username or password to access the files via host 100.

According to embodiments, multiple permissioned links may be configured to lead a user to the same event or sub-event webpage or folder. However, embedded within the links is information that allows host 100 to resolve the different permissions granted to the user 300, 400 connecting to host 100 via each permissioned link.

According to embodiments, permissions limit a user's actions. For example, a permissioned link may be created that prevents user using the link to do anything but read the files (i.e., the user would not be permitted to write or execute the file). Other permissions may allow a user to organize the files within the context of the event, for example moving or linking the files to a favorites folder.

According to embodiments, permissions permit user 300, 400 to access all digital files in event 112, or limit access to certain digital files by limiting access to only certain sub-events 114 of event 112, thereby allowing owner 200 or organizer 300 to permission event 112 itself or individual sub-events 114 accessible via each link. In other words, linked permissions tell host 100 "where" user 300, 400 is permitted to visit (i.e., what digital files user 300, 400 is permitted to access). For example, the bride decides that she would prefer if her parents and other family members not have access to photographs of her bachelorette party, so a permissioned link is created that allows access to all event 112 sub-events 114 except bachelorette party sub-event 112 which can then be forwarded to her family, who can then access all the wedding photographs except the bachelorette party photographs. Depending on the implementation, when the link is used, the user using it would not even be aware there is a sub-event for the bachelorette party. Other use permissions (i.e., printing, downloading, designating favorites, etc.) can be combined with sub-event access permissioning, as would be well known and understood by artisans.

FIG. 3 illustrates embodiments of permissioned links. According to embodiments, links will generally be appended to a URI as a subdirectory of a domain. For example, the link may take the form of http://[Subdomain.Domain]/[Optional String]/[Permission_String]. According to embodiments, the [Permission_String] comprises a unique identifier having series of random digits having a length sufficient for a user who has not received email 310 to be highly unlikely to randomly stumble upon it. For example, the random string could comprise a double encryption of a time stamp. Other randomization methods are equally as effective. Users using the permissioned links should not be able to reverse engineer working links that provide them with additional permissions from the context of the link, according to embodiments. [Optional_Path] may comprise additional path information or identifier, as will be readily known and understood by artisans. For example, [Optional_Path] may be used to alert the system that what follows is a permissioned link. According to another example, the link may take the form of http://[Subdomain. Domain]/[Optional_String]/[Entity_Unique_Identifier]/[Permission_String]. The [Entity_Unique_Identifier] option tells the system which entity is being used to request access, and [Permission_String] defines the permissions that apply for that entity.

According to other linked permission formatting embodiments, [Permission_String] may be divided into a string designating at least one of the account of owner 100, a string designating a given event 112, or a string designating a specific repository 114, or combinations thereof, together with a random string designating the permissions granted to the user 200, 300, 400 using the string to access the content via the host. The overall appearance of the string would appear random, according to embodiments. These strings may be random or may be static for each owner 100, event 112, or repository 114. Host 100 is configured to resolve the permissioned link and correctly direct the user 200, 300, 400 connecting to host 100 via the link to the correct repository and grant permissions with respect to the files in the permissioned repositories as described in greater detail below.

Upon creation, the unique identifier is correlated to an event. Creation may occur when the event is created or may be created based on some action taken by owner 200, depending on the implementation of host 100.

As illustrated by the flow diagram of FIG. 4, which illustrates a method in which host 100 handles permissioned links, host 100 receives the unique identifier as part of a URI pointing to host 100 in operation 502. According to embodiments, the [Optional_Path] string may be used to alert host 100 that a permissioned link is being presented. According to other embodiments, the system assumes each URI being used to access host 100 is a permissioned link. When the permissioned link is received, the unique identifier is looked up in the table of a database in operation 504. Many databases are contemplated, for example MYSQL database, ORACLE, and other commercial or proprietary databases. According to embodiments, effective database table includes the unique identifier, event 112 information, and the permission set associated with the permissioned link. The information in the database informs host 100 which event to display in operation 506 and causes host 100 to set the permissions for the user entering with the permissioned link having the particular unique identifier in operation 508.

Figure 5:
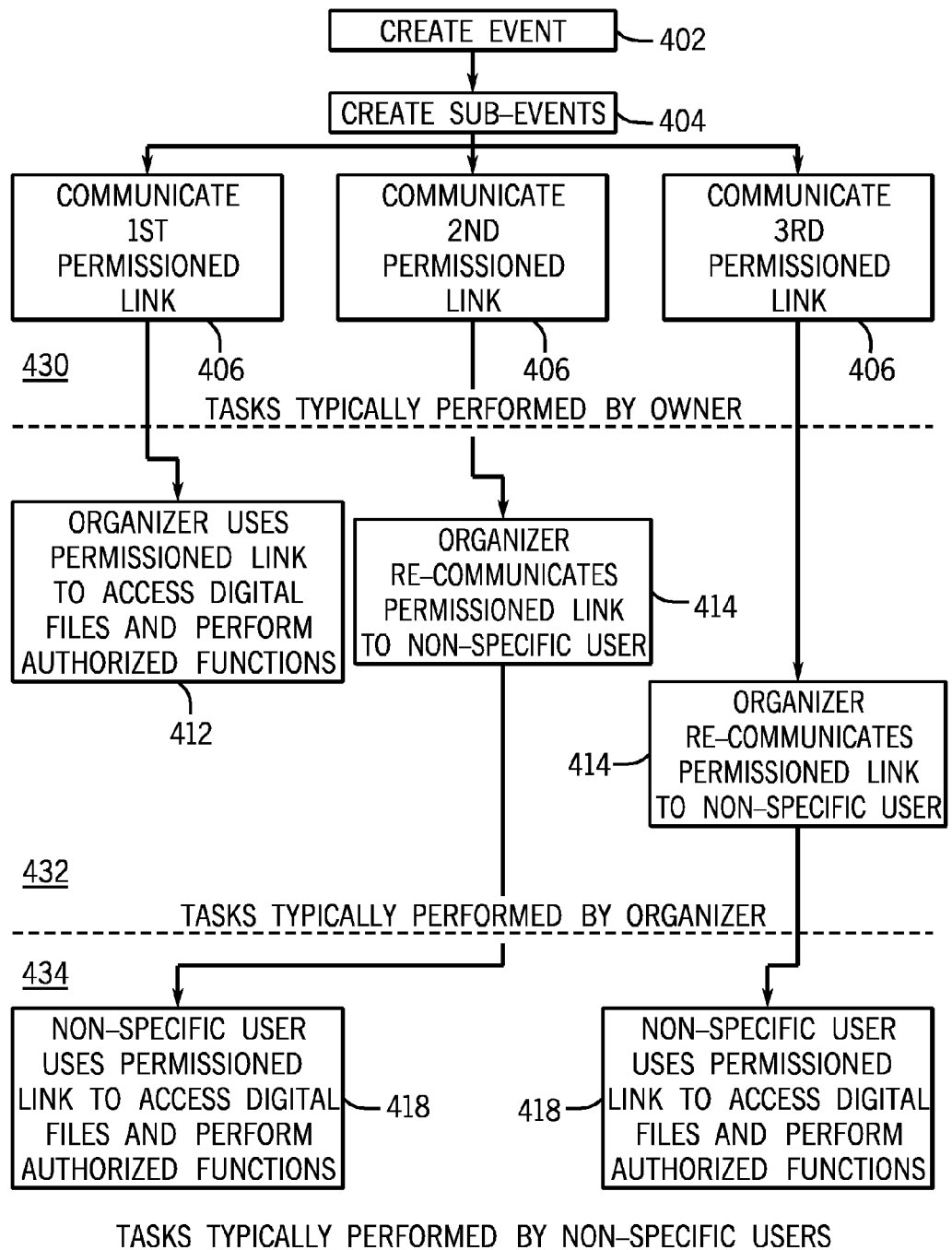
FIG. 5 is an embodiment of the use of permissioned links to permit unknown users access to repositories belonging to an event.

FIG. 5 illustrates embodiments of a method for credentialing users 300, 400 whereby the users have permissioned access to files via remote file access system. FIG. 5 breaks the process into three general groups, functions typically allowed by owner 200 shown in box 430, functions typically performed by organizer 300 shown in box 432, and functions allowed by non-specific users 434.

Figure 6:
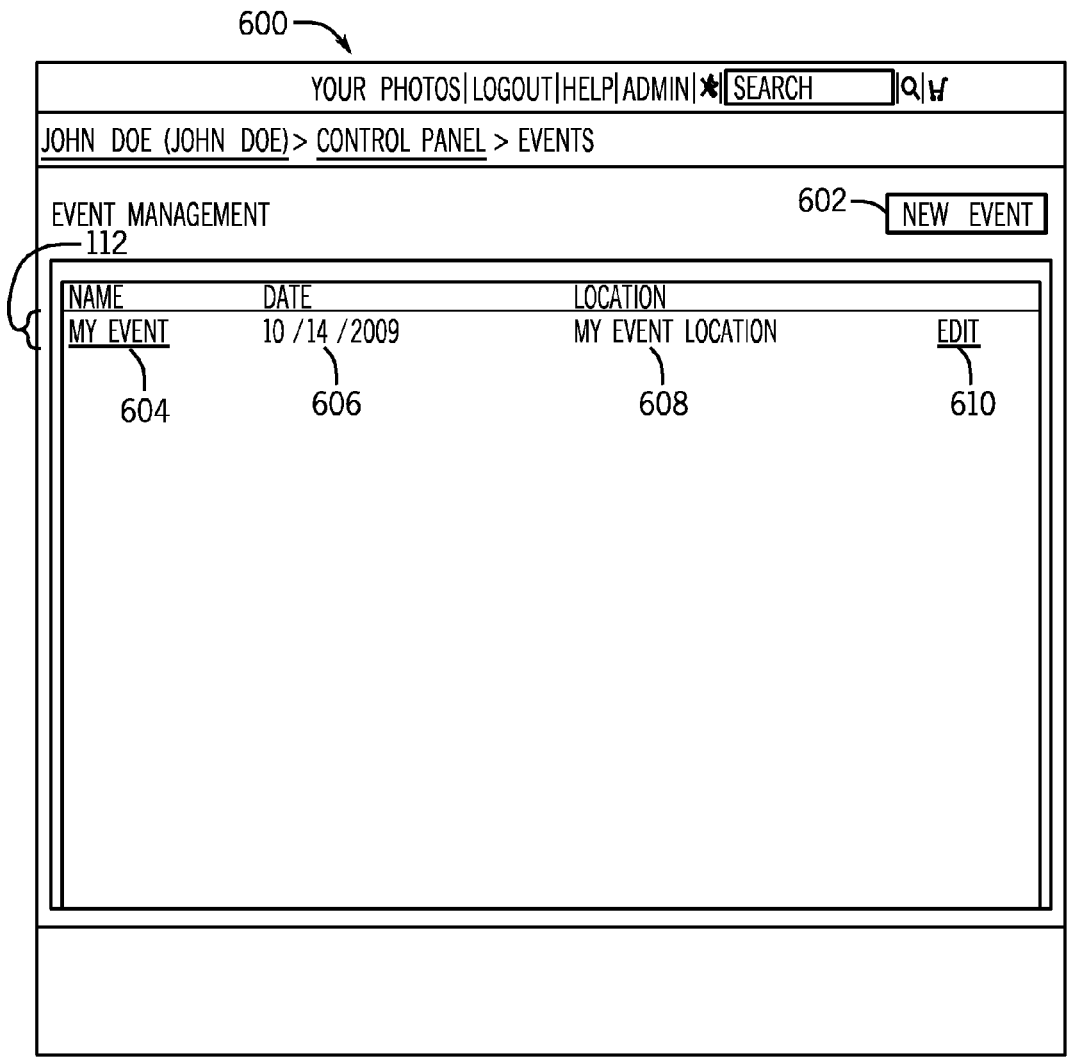
FIG. 6 is an exemplary embodiment of a webpage that allows an owner to manage, create, and edit events.

According to embodiments, owner 200 logs into host 100 and creates event 112 (operation 402). The creation of event 112 may occur before or after files corresponding to the event are uploaded to host 100. FIG. 6 illustrates embodiments of an event creation webpage 600. The event creation webpage 600 lists events 112 created by owner 200. Each event 112 displays an event name 604, the date the event was created 606, and a description of the event, such as an event location 608. Owners can add a new event using New Event button 602 or can edit a currently existing event by selecting Edit 610.

Figure 7:
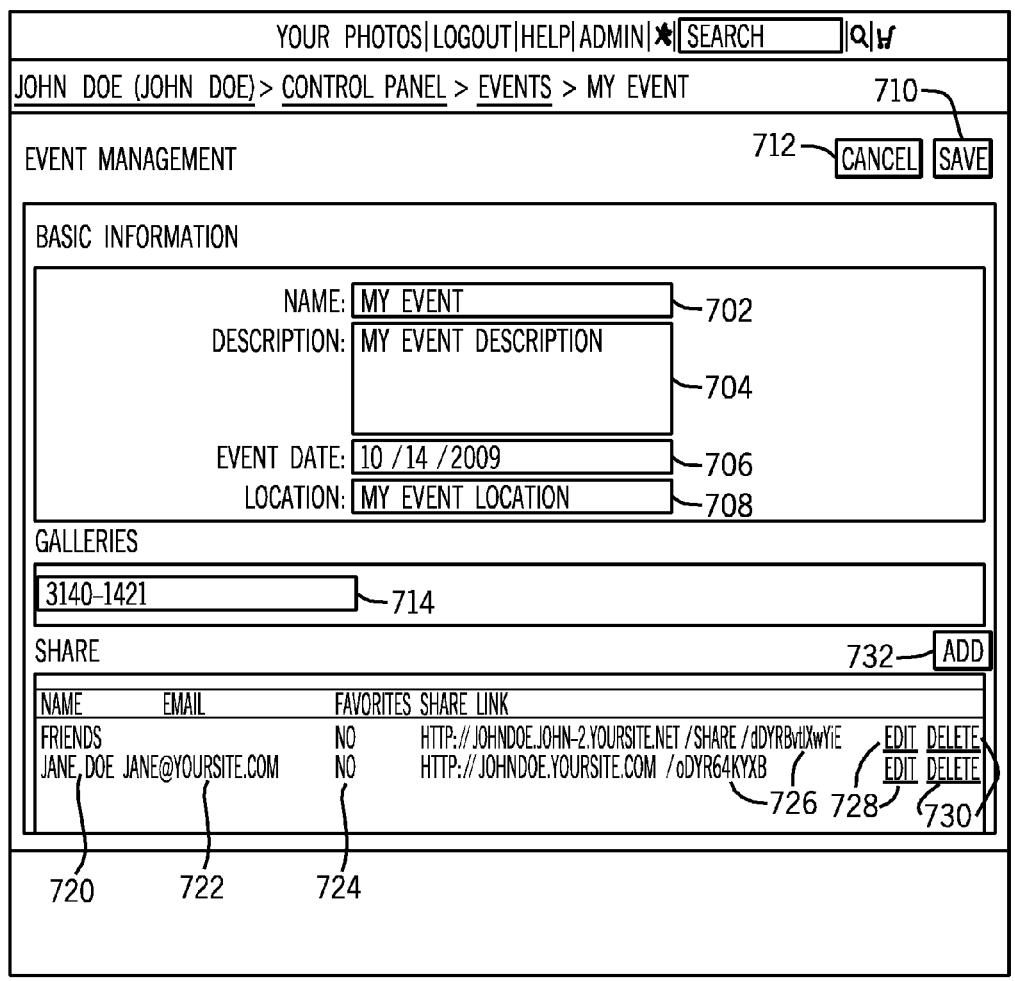
FIG. 7 is an illustration of an embodiment of a screenshot of a webpage for adding data to an event and creation of permissioned links.

FIG. 7 illustrates an embodiment of a webpage for the creation or editing of an event. Owner 200 inputs a name of event 112 in name field 702, a description of event 112 in description field 704, an event date in date field 706, and the location of event 112 in location field 708. According to embodiments, other fields may be added or replace fields shown in this exemplary webpage. For example, input of a location may not be appropriate in all organizational structures.

Turning again to FIG. 5, once event 112 is created in operation 402, sub-events 114 are created in operation 404. Turning again to FIG. 7, owner 200 can either specify sub-events 114 by inputting them into sub-event field 714 (which creates a gallery) or create new sub-events (not shown) for subsequent population of files. Owner 200 may also designate organizers 300 who will receive permissioned links, for example by email, by selecting the Add button 732. When Add button 732 is selected, owner 200 inputs Name 720, Email address 722, and designates the permissions to be granted with the permissioned link being created. In the example shown, only a single permission setting is shown—Favorites 724, which in the case of this exemplary embodiment would allow the user using the link to select photographs to be put or linked to a favorites folder. Also shown is the actual permissioned link 726. For each permissioned link, an option to Edit 728 the link or Delete 730 the link is permitted. After owner 200 inputs the desired information, owner 200 can save the event data by selecting the Save button 710 or delete the input data by selecting the Cancel button 712.

Turning back to FIG. 5, the permissioned linked are communicated from host 100 to organizer 300, for example by email, in operations 406, one communication for each permissioned link. As shown in FIG. 5, three permissioned links were created necessitating three communications containing the permissioned links in operations 406 but any number of permissioned links are contemplated. Turning back to FIG. 7, and according to embodiments, upon saving the event data, the newly created permissioned links are automatically sent to the email addresses specified with each link, or the intended recipient is otherwise notified of the permissioned link by another notification method if email is not utilized in the particular embodiment. According to embodiments, owner 200 is given an option to send or resend the permissioned links manually by selecting it as an option.

According to embodiments shown in FIG. 5, creation of event 112, sub-events 114, and communication of the permissioned links comprises the functions typically available to owner 200. Other options may be available to owner that are not shown, for example uploading files to host 100, editing files, watermarking files, printing files, editing event or slideshow settings, etc.

According to embodiments, organizer 300 receives the communications containing the permissioned links in operation 412. As described in greater detail above, each email will contain a permissioned link having associated with it a different set of permissions. Organizer 300 may use one or more of the links herself in operation 412, or may forward the communication on to non-specific users 400 in operations 414. Organizer 300 will be aware that access is controlled by the permissioned links, so she must carefully monitor which communication is sent to each non-specific user 400 to avoid forwarding a permissioned link having incorrect permissions for the intended non-specific user 400 and those other non-specific users 400 who might receive a copy of the communication from another non-specific user 400. Any non-specific user receiving a communication having a permissioned link will be able to access the files with the permissions granted by the particular permissioned link in the non-specific user's 400 possession in operation 418. Using the permissioned links and forwarding communications having the permissioned links are functions that are typically allowed to organizer 300, according to embodiments. Functions that are typically allowed to non-specific users 400 comprise forwarding communications having permissioned links in them, and accessing files according to the predetermined permissions.

EXAMPLES

Example 1

Event Management with Permissioned Links

Figure 8:
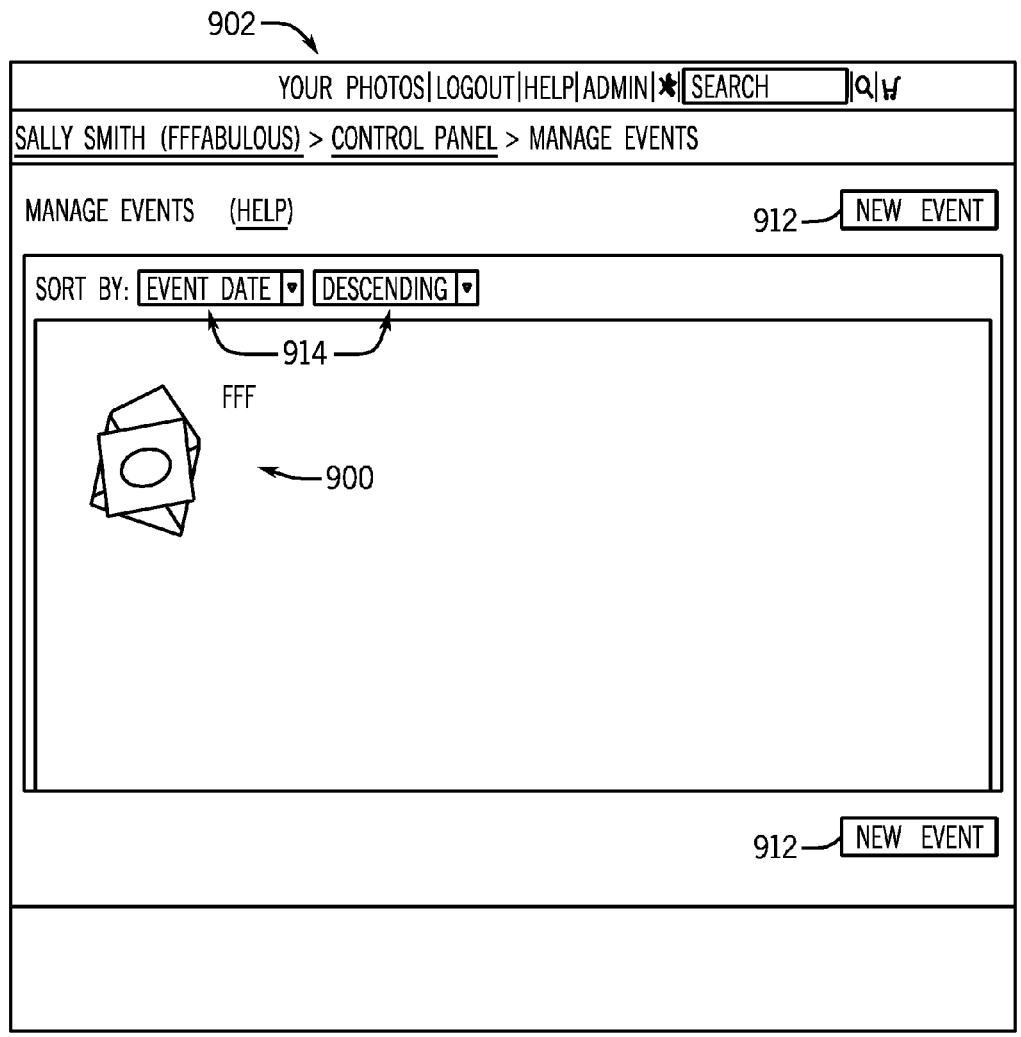
FIG. 8 is an exemplary embodiment of a webpage that allows an owner to manage, create, and edit events.
Figure 18:
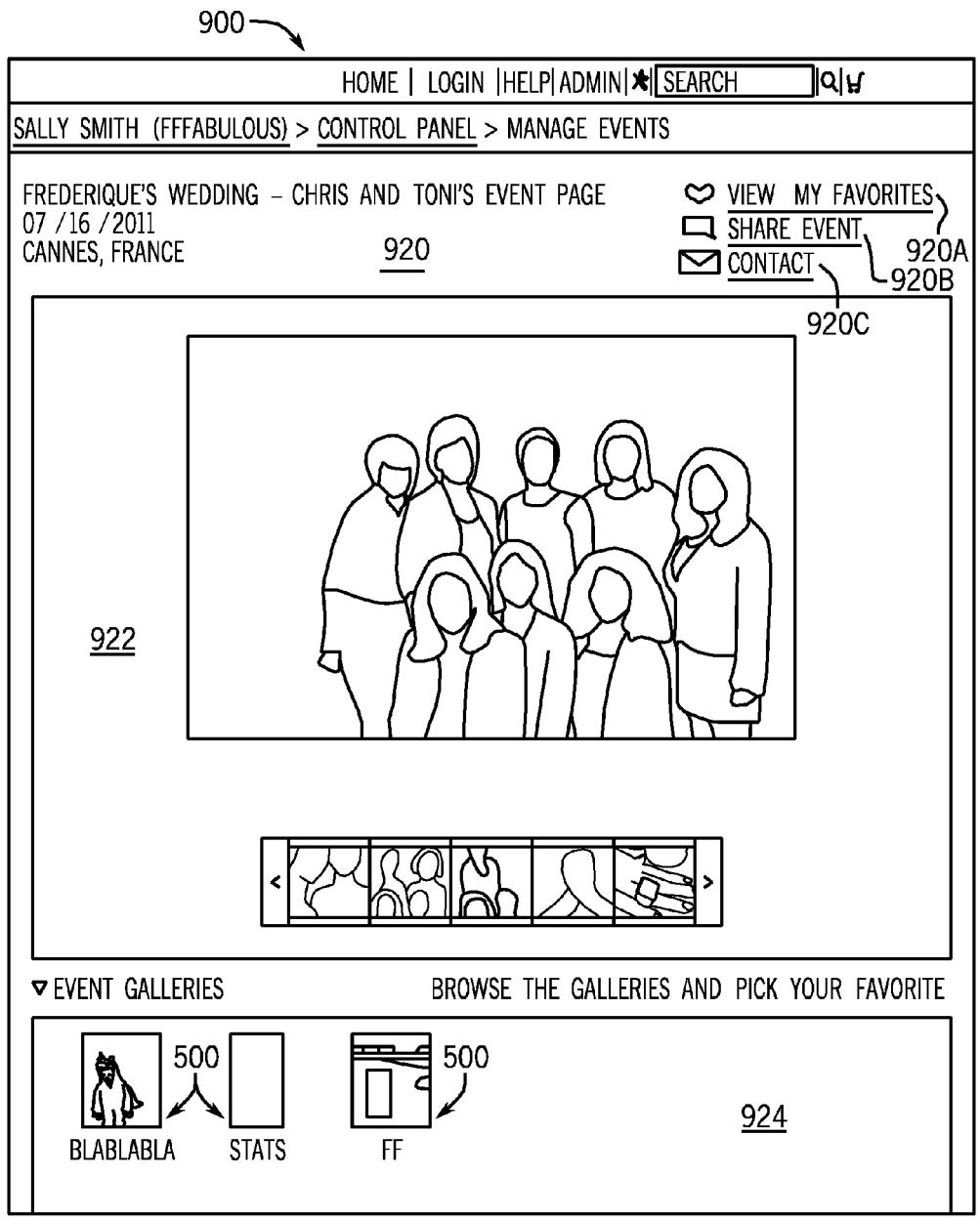
FIG. 18 is an exemplary embodiment of an event webpage.

According to embodiments, remote file access system can be used to manage galleries related to events. FIG. 8 illustrates event management webpage 902. Within each event management webpage 902, new events 900 can be created using New Event Button 912 or existing events 900 can be sorted using Event Sorting Option Buttons 914. According to the exemplary embodiments, each event 112 comprises one or more galleries of files that are related to that event 112. According to embodiments, each event may include other information associated with the one or more galleries, including event information, participants, etc. By clicking on the name or icon of the event 900, a user will be taken to an event webpage 900, as illustrated in FIG. 18.

When a new event is created, owner 200 is taken to event creation webpage 9120 as illustrated in FIG. 9. Event creation webpage 9120 comprises a plurality of category areas that allow owner 200 to input options for that particular category. For example, in the exemplary embodiment illustrated in FIG. 9, owner 200 can enter information and select options in the following category areas: event information area 9121, event settings 9122, galleries 9123, participants and registered guests 9124, and other guests 9125.

Event Information 9121 categories allows owner to input information about event 112 into fields 9121A-9121E. In name field 9121A, the user inputs a name of event 112. In field Event URL 9121B, the user can input alphanumeric characters that are used as part of the event URL. For example, in FIG. 9 the text input into Event URL 9121B is "Frederique's-Wedding," which would translate into an easy to remember URL such as "http://website.com/Frederiques-Wedding," helping participants and guests to quickly navigate to event webpage 900. Date field 9121C allows the date or dates of event 112 to be entered. Description field 9121D allows owner 200 to input a description of event 112. Finally, Location field 9121E allows the location of event 112 to be specified. With the exception of Name 9121A and Event URL 9121B fields, the other fields are optional.

Event Settings 9122 allows owner 200 to designate settings related to event 112. As illustrated in FIG. 9, options include Slideshow options 9122A, Guest Registration option 9122B, Privacy option 9122C, and Password options 9122D. FIG. 9 does not show an exhaustive list of the options that are possible. Slideshow options 9122A comprise two buttons "On" and "Off" that allow the user to select to show a slideshow on event webpage 900. A slideshow settings link directs owner 200 to a webpage or window, discussed below, that allows owner 200 to further specify slideshow settings, as illustrated in FIG. 10.

According to an exemplary slideshow settings window illustrated in FIG. 10, selection of the slideshow settings link shows an inset window 91220A that contains a series of options. A owner 200 can select which gallery or galleries are included in the slideshow using a Source option. The Height option allows owner 200 to dictate the size of the images shown in the slideshow. Click to Image causes the image to be displayed from the gallery. Captions designates whether the captions associated with each image to be shown as part of the slideshow. Show Thumbnails designates whether thumbnails are shown with the slideshow. Autostart designates whether slideshow will start automatically or whether organizer 300 or non-specific user 400 must click on a link to begin the slideshow. Speed allows owner 200 to designate how long each image is shown in the slideshow. Show Speed shows the speed of the slideshow and optionally allows the visitors to adjust the display speed. Page Style lets the user designate some aesthetic display features. Show Button shows option buttons with the slideshow. Random Start, Randomize, SlasphURL, Splash Delay, and Cross Fade Speed provide further options for the display of the slideshow. Once the settings are selected by the user, owner 200 clicks the "OK" button to save the slideshow settings. If owner 200 later decides not to display a slideshow, owner 200 can select the "Cancel" button to abort any entered settings, saving none of the settings. Owner 200 can optionally preview the slideshow with the Preview button.

Turning again to FIG. 9, Guest Registration setting 9122B in the Event Settings Area 9122 allows owner 200 to designate when a guest (e.g., organizer 300 or non-specific user 400) must be registered to view event webpage 900. If owner 200 selects "Registered," guests who are registered can select favorites from the event, as well as browse, buy, share, or select favorite images within the event. Where owner 200 selects registration is "Suggested," guests may view event webpage 900 as a guest and be prompted to register, but cannot select favorites until they are registered. Note that according to these embodiments, there may be multiple organizers 300 or non-specific users 400 that have varying permissions (i.e., non-specific users that are registered will have the ability to select favorites that will appear on a personalized event 112 webpage for each registered non-specific user 400). If owner 200 selects "Optional" for guest registration, guests can view event webpage 900, but will be prompted to register if they wish to select favorites. Finally if owner 200 selects "Off," guests cannot select favorites, only organizers 300 of the event can. Similarly, the Privacy setting 9122C allows the user to designate whether event 112 is listed as a Public event or an Unlisted event, which causes the event to be registered for access globally (public) on remote file access system to all users of remote file access system, including strangers, or doesn't list the event globally (unlisted). If public, event 112 can be featured on owners 200 homepage by ticking the radio box next to "Featured on Homepage." Owners 200 can optionally password protect event 112 (whether public or unlisted) by ticking the radio box next to "Password protect this Event." When the radio box is ticked, a Password field and Customer Password Hint field are shown, which allows owner 200 to enter the password required to access event webpage 900 and a password hint to remind visitors, such as organizer 300 and non-specific user 400, of the password. A "Passworded Gallery Access" radio box is also shown which allows users who correctly enter the password to also get access to the galleries that are part of event 112.

Figure 11:
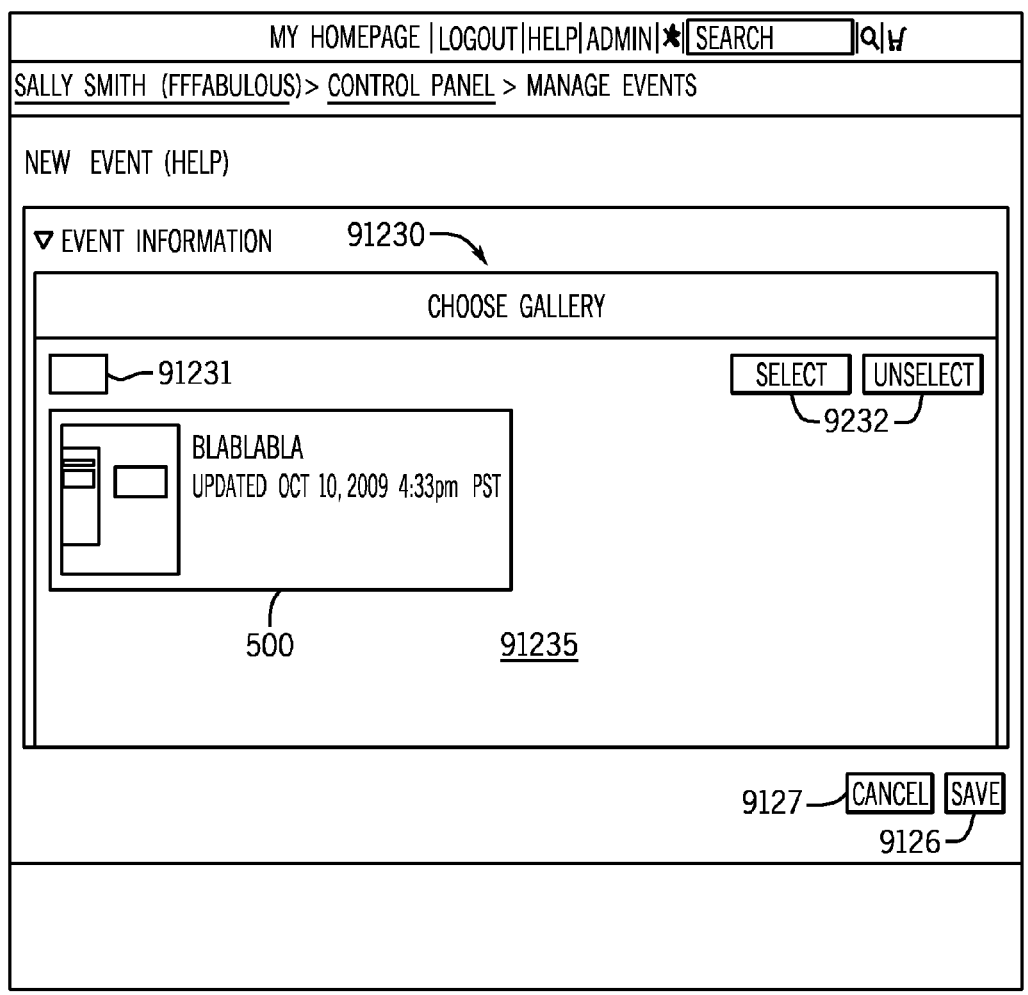
FIG. 11 is an exemplary embodiment of a webpage that provides an interface whereby the owner of an event may select galleries to be shown on the event webpage.

Galleries area 9123 allows owner 200 to select galleries that are included as part of event 112 and displayed on event webpage 900. To add a gallery, owner 200 selects Add Button 9123A, which takes owner 200 to add gallery window in which owner 200 can select galleries 500 that are included as part of the event, as illustrated in FIG. 11. To select gallery 500, owner 200 clicks Gallery Selection Button 91231 and selects a category of galleries from a drop down list, which causes galleries 500 to be shown in the categories in Gallery Display Space 91235. Owner 200 selects each gallery that owner 200 wishes to be included in event 112. Each time owner 200 selects a gallery, it is highlighted. Owner 200 can optionally select all shown galleries 500 or deselect all shown galleries 500 with Selection Buttons 91232. Once all galleries 500 are selected, the user selects the "OK" 91233 to save the settings. In an alternate embodiment, all the owner's 200 galleries 500 are automatically shown in Gallery Display Space 91235 without the need to select gallery categories. Once galleries 500 have been selected, gallery thumbnails are displayed in the Gallery area 9123, as illustrated in FIG. 12.

Participants area 9124 displays event participants and event guests. According to embodiments, participants are organizers 300 and event guests are non-specific users 400. To add participants to an event, the user selects the Add Participant Button 9124A, which causes Add Participant window 91240 to be displayed. In the Add Participant window, owner 200 enters the name and email address of each participant and selects the "OK" button. The Notes field allows the user to personalize each Participant invitation that is sent when each participant is added. After adding participants, each participant is shown in Participants area 9124, as shown in FIG. 14. According to embodiments, adding galleries and participants to event creation webpage 9120 is temporary, illustrated in FIG. 14 by showing "Unsaved" under each gallery 500 and next to each participant, until owner 200 selects "Save" button 9126. After saving, the "Unsaved" notation under unsaved galleries and next to unsaved participants is removed, as illustrated in FIG. 15.

As further illustrated in FIG. 15, once saved, "View Personal Page" link is shown that links to each participant's personal event page 9124A. View Favorites link 9124B is also shown, which shows the favorites selected by the participant.

Finally Email link 9124C is shown that lets owner 200 send a personalized email message inviting the participant to event webpage 900 with a permissioned link, as shown in email window 91240 of FIG. 16.

Owner 200 may abort any settings entered in event creation webpage 9120 by selecting the "Cancel" button 9127.

Once saved, a permissioned link appears in Other Guests area 9125, which can be disseminated to guests (non-specific users 400) to visit event webpage 900. For guests that have registered after using the link, they will show up as guests 9124D in Participants and Guests area 9124, as illustrated in FIG. 17.

Event webpage 900 is illustrated according to an exemplary embodiment in FIG. 18. Event webpage 900 comprises title area 920, optional slideshow area 922, and gallery area 924. The settings data input event information area 9121 (FIG. 10) is displayed in title area 920, as well as a View My Favorites link 920A for reviewing favorites, Share Event link 920B for sharing the event with others, and Contact link 920C for contact the owner of event 112. Slideshow area 922 displays a slideshow if owner 200 designated options for a slideshow to be shown. Event gallery area 924 shows galleries 500 that are part of event 112.

If a password is associated with event 112, participants or guests trying to access event webpage 900 are prompted to enter the password prior to being able to access event webpage 900, as illustrated in an exemplary webpage in FIG. 19. The password that must be entered, as well as the password hint are specified by owner 200 in the settings selected in Event Settings area 9122.

Figure 20:
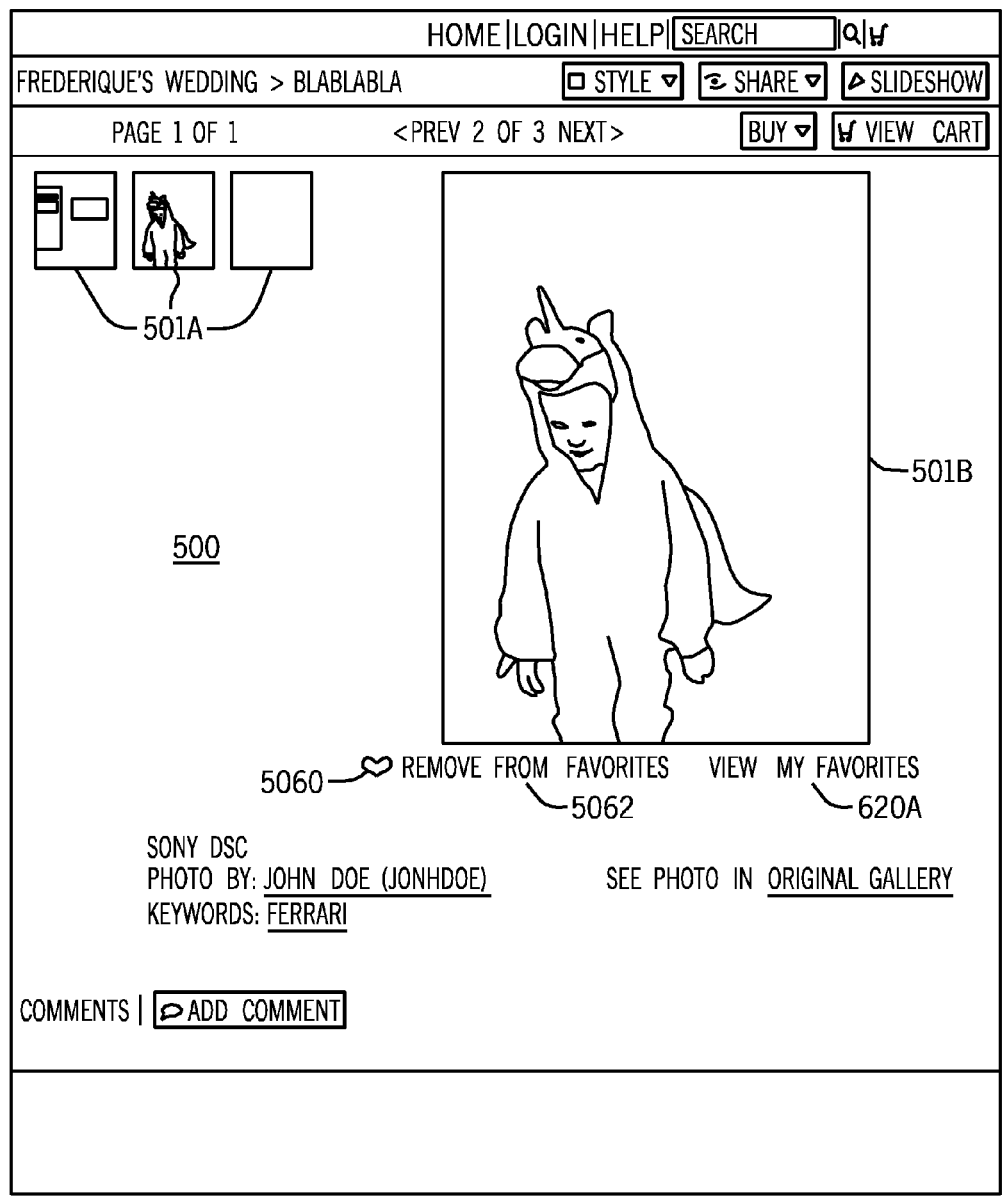
FIG. 20 is an exemplary embodiment of a gallery webpage showing files that are part of the gallery.

According to the exemplary embodiments, when a participant or guest selects gallery 500 to view from event webpage 900, files in gallery 500 are shown as illustrated if FIG. 20. Files 501A, 501B are shown as thumbnails 501A and a screen or window-sized version of file 501B. If participant or guest is allowed to select favorites, or is a registered guest and permissioned to select favorites, under the screen or window-sized version of file 501B are a plurality of options to select from. The participant or guest can click "Add to Favorites" link (not shown) to add the file to the user's favorites. Once file 501B is selected as a favorite by clicking on the "Add to Favorites" link, remote files access system indicates the file is a favorite with heart 5060, and a "Remove from Favorites" link replaces the "Add to Favorites" link. Selecting "Add to Favorites" causes file 501B to be collected into favorites gallery 500. Irrespective of whether file 501B is a favorite or not, a link to "View my Favorites" is presented (if there are favorites to view). Clicking on this link will cause a favorites gallery 500 to be shown, which contains all the files that have been collected as favorites.

Figure 21:
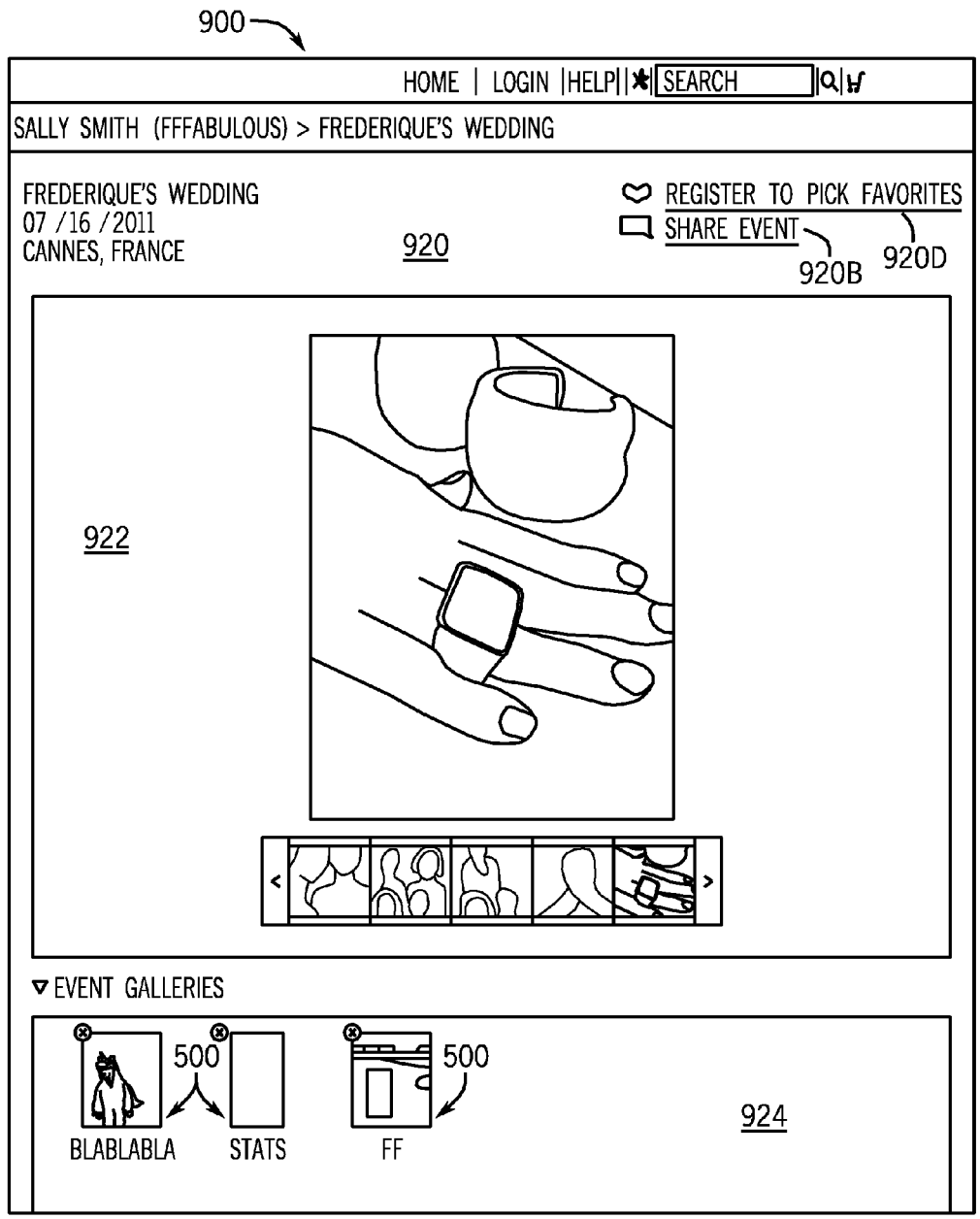
FIG. 21 is an exemplary embodiment of a gallery webpage viewed by an unregistered guest.

FIG. 21 illustrates an embodiment of event webpage 900, similar to event webpage 900 illustrated in FIG. 18, for unregistered guests who visit event webpage 900 via the permissioned link provided in Other Guests area 9125. Event webpage 900 for unregistered guests is the same as event webpage 900 for registered guests and participants, except for the links presented in title area 920 which are different due to differences in the permissions granted. According to other embodiments, the permissioned links presented to unregistered guests will cause a different set of galleries 500 to be displayed on event webpage 900. According to the version of event webpage 900 illustrated in FIG. 21, an unregistered guest is presented with two links: Register to Pick Favorites Link 920D and Share Event Link 920B. If the unregistered guest registers, they are presented with the version of event webpage illustrated in FIG. 18. Clicking on Register to Pick Favorites link 920D causes event registration window 9200 to open, which prompts the unregistered guest to input a name, email address, and security code, according to embodiments and as illustrated in FIG. 22.

Once the unregistered user inputs this information and clicks on the "Register" button 9202, event registration confirmation window 9204 is displayed as illustrated in FIG. 23, and confirmation email 9210 is sent to the unregistered user as illustrated in FIG. 24. Confirmation email comprises confirmation link 9212 that the unregistered user must select to complete the registration. Once confirmation link 9212 is clicked, the registration process is complete. Confirmation link 9212 is not a permissioned link, but causes, according to embodiments, the permissions for the guest to change when the guest's status changes from unregistered to registered.

Unregistered guests will be prompted to register if the event settings required require registration prior to viewing event content or suggest registration prior to viewing event content. If registration is required, event registration window illustrated in FIG. 22 is displayed and must be completed prior to the guest being permitted to view the content of event webpage 900. Artisans will appreciate that registered guests (non-specific users 400) can still differ from participants (organizers 300) due to be original permissioned link that is used to access event 112. FIG. 25 illustrates an embodiment of event webpage 900 that automatically shows event registration window 9200 upon a visit to event webpage 900 by an unregistered user. Accordingly, two additional options are available: No Thanks button 9206 allows the unregistered user to view content of event webpage 900 without registering, and ticking Do Not Show this again radio box 9208 prevents event registration window 9200 from being displayed to the unregistered user in subsequent visits. Otherwise, the unregistered user can register and receive upgraded privileges as described above.

Although guest may be prompted to register, it is noteworthy that remote file access system differentiates guests from participants based on the link that is used to access event 112. Participants need not register because remote file access system will recognize each participant from the permissioned link that is used to access event 112.

In various embodiments, the remote file access system is implemented and operational in an information technology infrastructure or with numerous other general purpose or special purpose computing system environments or configurations. Examples of well known computing systems, environments, or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The remote file access system may be described in the general context of machine readable or computer-executable instructions, such as program modules, being executed by a computer or other processing unit. Generally, program modules include routines, programs, objects, components, data structures, etc. that perform particular tasks or implement particular abstract data types. The devices and systems may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, the remote file access system includes at least one central processing unit (CPU) or processor. According to embodiments, the CPU is coupled to a memory, ROM, or machine readable or computer-readable media containing the machine or computer-executable instructions for creating, propagating, and resolving events and the permissioned links associated with them. Machine readable or computer readable media can be any available media that can be accessed by the system and includes both volatile and nonvolatile media, removable and non-removable media implemented in any method or technology for storage of information such as computer readable instructions, data structures, program modules, or other data. Computer storage media includes, but is not limited to, RAM, ROM, EEPROM, flash memory, portable memory, remote storage solutions, or other memory technology, CD-ROM, digital versatile disks (DVD), or other optical disk storage, magnetic cassettes, magnetic tape, magnetic disk storage or other magnetic storage devices, or any other medium which can be used to store the desired information and which can be accessed by the remote file access system. The machine readable or computer readable media may store instructions or data which implement all or part of the system described herein.

Communication media typically embodies computer readable instructions, data structures, program modules, or other data in a modulated data signal such as a carrier wave or other transport mechanism, and includes any information delivery media. By way of example, and not limitation, communication media includes wired media such as a wired network or direct-wired connection, and wireless media such as acoustic, RF, infrared and other wireless media. Combinations of any of the above should also be included within the scope of the communication media.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A system comprising:
at least one computer making a repository of private remote digital files available to a remote user, the repository of private remote digital files being accessible from remote locations, the repository being permissioned with a first set of permissions and a second set of permissions different from the first set of permissions by an owner of the repository, wherein the repository exists in conjunction with an event, wherein the event comprises at least one sub-event, each sub-event being a repository, wherein each sub-event inherits the permissions of the repository, and wherein the owner communicates to the user a first permissioned link and a second permissioned link for credentialing the remote user that is created upon the repository being permissioned;
a permissioned link database having a table therein correlating a uniform resource indicator (URI) of the first permissioned link and the second permissioned link with the first set of permissions and the second set of permissions, the first set of permissions and the second set of permissions defining anonymous access permissions for use of the private remote digital files in the repository; and
a host for receiving from the user an anonymous request via the first permissioned link and the second permissioned link and for communicating private remote digital files to at least the user based on the first set of permissions or the second set of permissions associated with the first permissioned link or the second permissioned link, wherein the host allows any unregistered user requesting access to the repository with the first permissioned link or the second permissioned link to access the repository according to the first set of permissions or the second set of permissions in the permission set, and wherein the user remains an unregistered user.

2. The system of claim 1, wherein the first set of permissions and the second set of permissions are both created when the repository is created.

3. The system of claim 1, wherein the repository contains only sub-events and does not contain private remote digital files.

4. A method comprising:
permitting a first user to cause creation of a repository of private remote digital files, wherein the first user chooses a first set of permissions and a second set of permissions different from the first set of permissions to be associated with a first permissioned link and a second permissioned link, respectively, that is used to remotely and anonymously access the repository of private remote digital files, wherein the repository is a component of an event, wherein each event comprises at least one sub-event, the sub-event being a repository of files, and wherein each sub-event inherits the permissions of the first permissioned link and the second permissioned link;
causing transmission of a communication containing the first permissioned link and the second permissioned link to a second user, wherein the second user is unregistered and remains unregistered with the repository;
receiving from the second user an anonymous request to access private remote digital files associated with the first permissioned link and the second permissioned link;
resolving the first permissioned link and the second permissioned link by correlating the first permissioned link and the second permissioned link with the first set of permissions and the second set of permissions, respectively; and
permitting the second user to access the content associated with the first permissioned link and the second permissioned link according to the permissions in the first set of permissions and the second set or permissions, wherein the first permissioned link and the second permissioned link each comprise at least a unique identifier.

5. The method of claim 4, further comprising permitting any third user to access the content associated with the first permissioned link and the second permissioned link according to the permissions in the first set of permissions and the second set of permissions if the first permissioned link and the second permissioned link are received from the third user.

6. A non-transitory machine-readable medium having instructions stored thereon comprising:
permitting a first user to cause creation of a repository of private remote digital files, wherein the first user chooses a first set of permissions and a second set of permissions different from the first set of permissions to be associated with a first permissioned link and a second permissioned link, respectively, that is used to remotely and anonymously access the repository, wherein the repository is a component of an event, and wherein each event comprises at least one sub-event, the sub-event being a repository of private remote digital files, and wherein each sub-event inherits the permissions of the first permissioned link and the second permissioned link;

causing transmission of a communication containing the first permissioned link and the second permissioned link to a second user, wherein the second user is unregistered and remains unregistered with the repository;

receiving from the second user an anonymous request to access the private remote digital files associated with the first permissioned link and the second permissioned link;

resolving the permissioned link by correlating the first permissioned link and the second permissioned link with the first set of permissions and the second set of permissions, respectively; and permitting the second user to access the content associated with the first permissioned link and the second permissioned link according to the permissions in the first set of permissions and the second set of permissions, wherein the first permissioned link and the second permissioned link each comprise at least a unique identifier.

7. The non-transitory machine-readable medium of claim 6, further comprising permitting any third user to access the content associated with the first permissioned link and the second permissioned link according to the permissions in the first set of permissions and the second set of permissions if the first permissioned link and the second permissioned link are received from the third user.

8. The method of claim 5, wherein the third user is an unregistered user.

9. The method of claim 7, wherein the third user is an unregistered user.

* * * * *